(12) United States Patent
Brusa

(10) Patent No.: US 12,294,251 B2
(45) Date of Patent: May 6, 2025

(54) BRUSHLESS TOOL DETECTOR AND METHOD OF USE THEREFOR

(71) Applicant: Allora International, LLC, Sussex, WI (US)

(72) Inventor: Guido Brusa, Brookfield, WI (US)

(73) Assignee: Allora International, LLC, Sussex, WI (US)

( * ) Notice: Subject to any disclaimer, the term of this patent is extended or adjusted under 35 U.S.C. 154(b) by 193 days.

(21) Appl. No.: 18/305,432

(22) Filed: Apr. 24, 2023

(65) Prior Publication Data
US 2024/0106306 A1 Mar. 28, 2024

Related U.S. Application Data

(63) Continuation of application No. 17/935,173, filed on Sep. 26, 2022, now Pat. No. 11,677,298.

(51) Int. Cl.
*G03B 17/18* (2021.01)
*H02K 11/23* (2016.01)
*H02P 6/16* (2016.01)

(52) U.S. Cl.
CPC ............... *H02K 11/23* (2016.01); *H02P 6/16* (2013.01); *H02P 2207/05* (2013.01)

(58) Field of Classification Search
CPC ....... H02K 11/23; H02P 6/16; H02P 2207/05; G03B 17/18; A61B 1/00165
See application file for complete search history.

(56) References Cited

U.S. PATENT DOCUMENTS 5,521,671 A * 5/1996 Aoki ................ G03B 17/18
396/281
2018/0028052 A1 * 2/2018 Kojo .................. A61B 1/00165

* cited by examiner

*Primary Examiner* — Cortez M Cook
(74) *Attorney, Agent, or Firm* — Boyle Fredrickson, S.C.

(57) ABSTRACT

A detection sensor including an alternating current (AC) permanent magnet synchronous motor (PMSM) housed in a casing, a motherboard and an AC servo controller with a permanent memory in electronic communication with the PMSM, and a shaft extending from the PMSM configured to rotate a sensing needle wherein the sensing needle is configured to sense an object in its rotation.

12 Claims, 4 Drawing Sheets

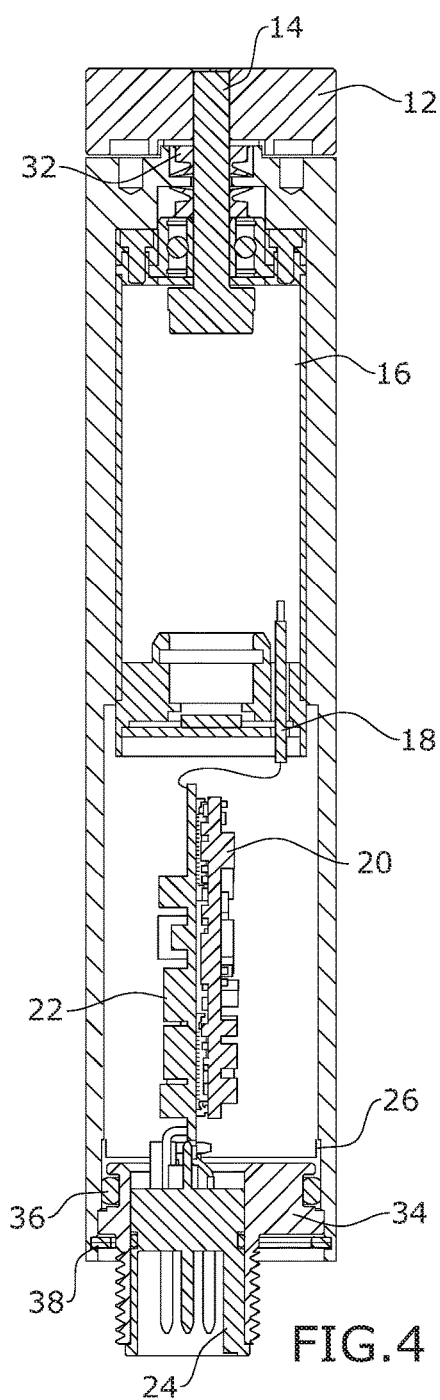
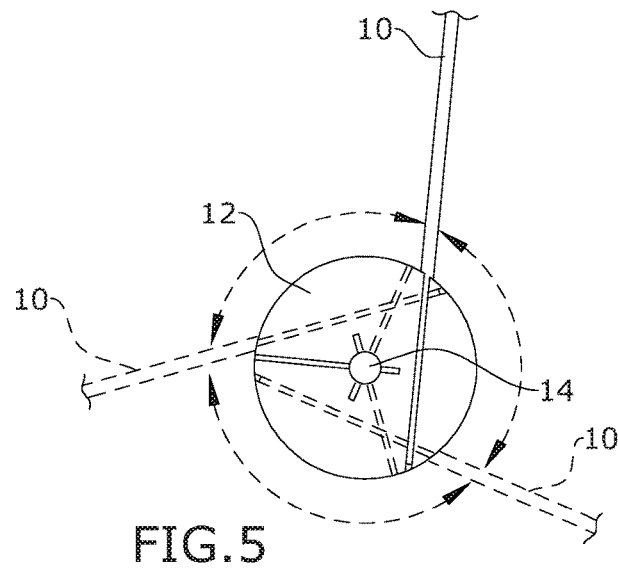
FIG.4
FIG.5

BRUSHLESS TOOL DETECTOR AND METHOD OF USE THEREFOR

CROSS-REFERENCE TO RELATED APPLICATIONS

This application is a continuation of and claims priority to U.S. application Ser. No. 17/935,173, filed Sep. 26, 2022, the entire contents of which is incorporated here by reference.

BACKGROUND OF THE INVENTION

The present invention relates to tool detectors and, more particularly, to a brushless tool detector and a method of use therefor.

Presently, tool detectors, specifically those with direct current (DC) motors, fail due to a formation of dead spots on a commutator. This is primarily due to the accumulation of carbon particles around the edges of a commutator bar thus causing a commutator permanent damage, particularly in applications where DC brush motors rotate less than one revolution and/or reciprocates (forward and backward rotation at short intervals) or sits at a particular spot, under power, for long periods of time between cycles. Those conditions, individually or in combination, result in premature failure of the motor due to the commutator developing dead spots that in essence make the DC brush motor inoperable.

Additionally, external controls, typically required to operate DC motor driven systems, are cumbersome and take up valuable space in an electrical control cabinet. Moreover, a DC brush motor has limited detection sensitivity due to a lack of full servo loop control.

An AC brushless motor, also known in the industry as a Permanent Magnet Synchronous Motor (PMSM) lacking brushes and commutator, is not subjected to all issues relating to commutation including premature failure, a typical problem shown in DC motors.

As can be seen, there is a need for a tool detector utilizing a "PMSM" motor and a method for using such in place of a DC brush motor.

SUMMARY OF THE INVENTION

In one aspect of the present invention, a detection sensor comprises an alternating current (AC) permanent magnet synchronous motor (PMSM) housed in a casing, a motherboard and an AC servo controller with a permanent memory in electronic communication with the PMSM, and a shaft extending from the PMSM configured to rotate a sensing needle wherein the sensing needle is configured to sense an object in its rotation.

Advantageously, the present invention may eliminate all the issues related to dead spots typical of similar style tool monitoring devices that operate with brush style motors. It may increase consistency and longevity of a motor particularly in an application where the motor can only rotate less than one revolution and/or in a reciprocal motion, or has to sit in a particular spot, under power, for an extended period between cycles.

It can also be operated in harsh environments and may be utilized where free space monitoring is a requirement.

The present invention may fill a need for multiple sensors combined into a single machine tool still maintaining individual set parameters for each of the sensors.

Furthermore, by bending or conforming a sensing needle of the present invention to accommodate a specific application, it may monitor the presence or absence of a part or a hole in a robotic or automated assembly operation during unattended operation.

The AC brushless motor may rotate by a fraction of a full revolution, without failure due to brush decay, thus maintaining controlled rotation, velocity, and torque.

The device may have a fully integrated control, operate without a gear box, be controlled directly from a machine tool control, and be daisy chained, in some embodiments up to 127 sensors/systems, all individually and simultaneously communicating with the machine tool without a need for an external control.

These and other features, aspects and advantages of the present invention will become better understood with reference to the following drawings, description, and claims.

BRIEF DESCRIPTION OF THE DRAWINGS

FIG. 4 is a cross sectional view on line 4-4 of FIG. 1;

FIG. 5 is a top view of the sensor showing a rotation; and

DETAILED DESCRIPTION OF THE INVENTION

Figure 1:
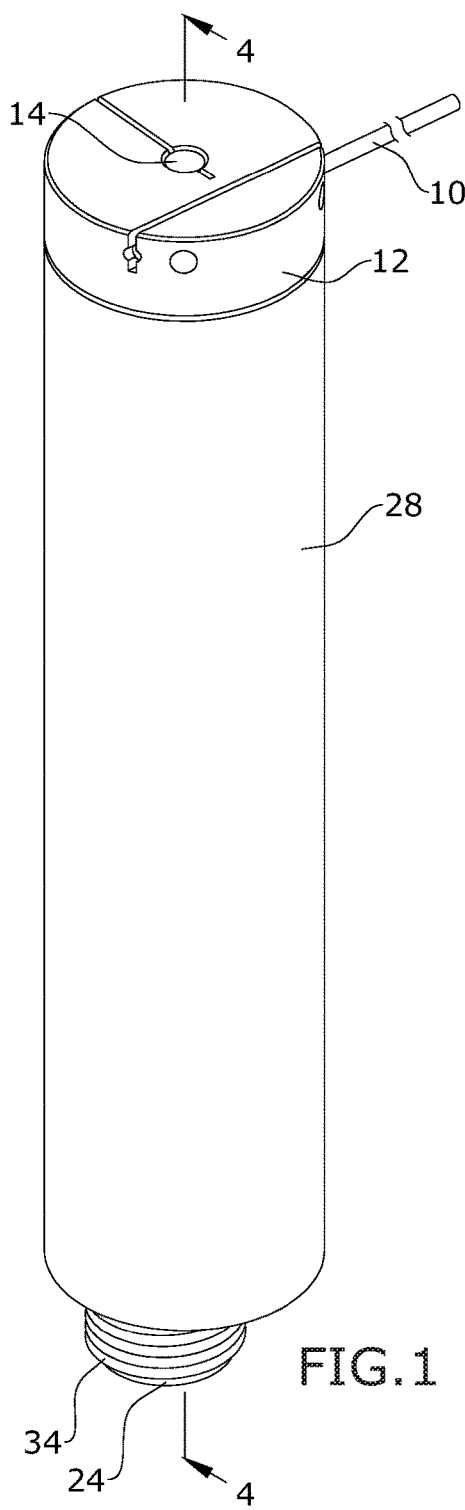
FIG. 1 is a perspective view of a sensor according to an embodiment of the present invention.
Figure 2:
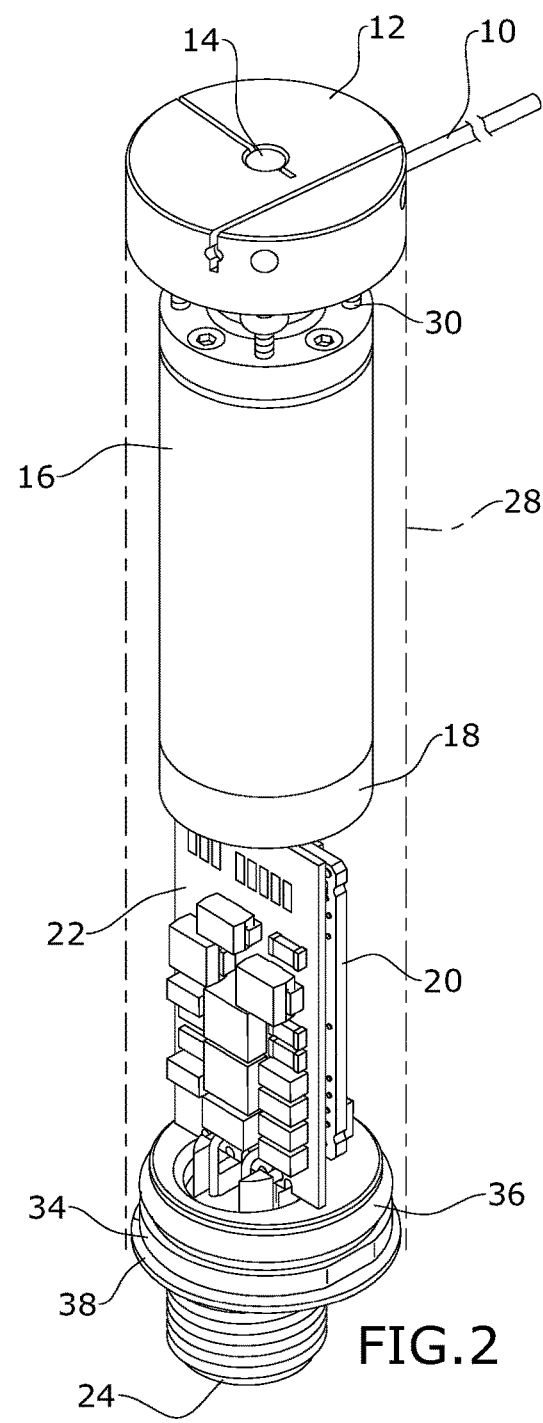
FIG. 2 is a perspective view thereof with a casing and isolating shield omitted.
Figure 3:
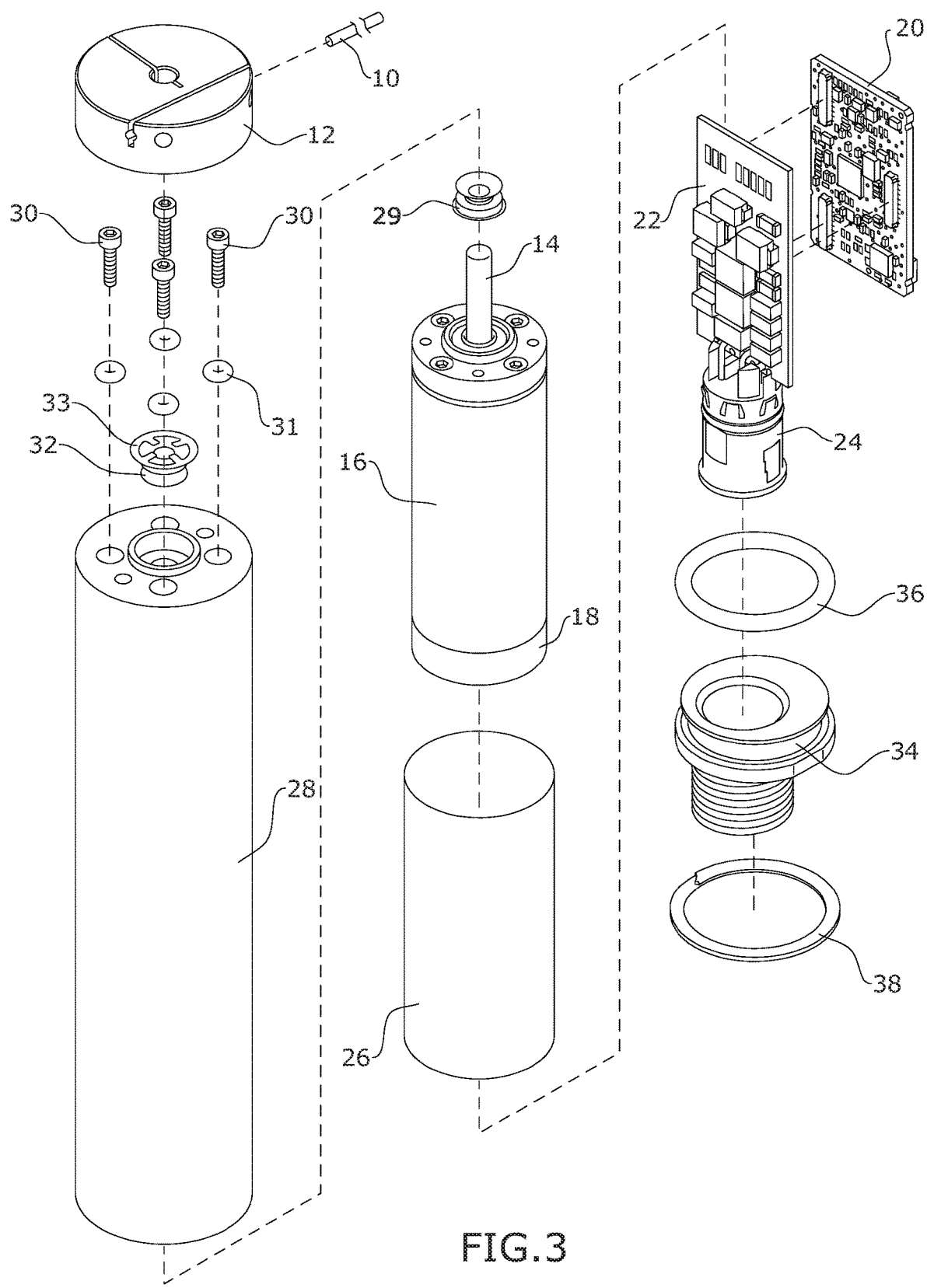
FIG. 3 is an exploded view of the sensor of FIG. 1 detailing internal components.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims with reference to the drawings.

A general overview of the various features of the invention will be provided, with a detailed description following. Broadly, an embodiment of the present invention provides a detection tool or a sensor utilizing an alternating current (AC) brushless motor (or Permanent Magnet Synchronous Motor (PMSM)) with an integrated AC servo drive controller. The sensor may be a Positive Contact Sensor (PCS) with Extreme Range (ER).

The AC servo drive controller may enable highly sensitive, low impact detection. The integrated AC servo drive controller may remove a need for external controls, typically required to operate conventional DC brush motors.

The PMSM may be integrated into a body or casing. The body may be metal and sized to house the motor as well as the integrated AC servo drive controller. The body may be less than 100 mm in length and 19 mm in diameter, equipped with non-volatile memory to store all detection parameters and control settings. With a proper connection to the outside, the device could function in a harsh and coolant flooded environment while being controlled and communicating to a connected machine tool control. The device may communicate, for example by CANopen® technology, which may enable for simple communication with machine controls and networking of multiple sensors, all operating at the same time and with individually set parameters. Devices may be daisy chained, connected together, to be controlled individually. A user would be able to send to and receive from each device specific information to and from the device, thus having the machine tool that incorporates such devices act accordingly, based on the information sent and received. With the communication technology, the sensor may react to certain error conditions or influence, and the user may control the network in accordance with findings of the sensor.

The present invention comprises an absolute encoder outfitted onto the PMSM to provide feedback information for speed and position by outputting a digital word or bit in relation to motion. The absolute encoder may be mounted directly on the back of the PMSM and enable accurate position setting and reference, maintaining set parameters in the AC servo controller's permanent memory for easy and flexible installation and recall of various previously set configurations. The encoder enables elimination of internal or external stops or reference for a "Home" position, and it is necessary to be able to know the actual rotational position even after a power failure or at start up after the machine has been powered down at the end of a shift.

The integrated PMSM and AC servo controlled sensor may be fitted onto any machine tool to detect a broken or missing tool or object.

In some embodiments, a gearbox may be mounted on a front of the unit, such as directly on top of the motor, so that a shaft coming out of the of the sensor body would be the shaft coming out the gearbox that is mounted directly onto the motor. Rotation may then be converted into a linear motion, enabling accurate measurement and/or probing of objects or cavities at a right angle to it, at a relatively long distance or depth from the sensor itself.

In some embodiments, the device may be daisy chained, up to 127 sensors/systems all individually and simultaneously communicating with the machine tool without a need for an external control.

Referring now to the Figures, FIGS. 1-4 detail a motor according to an embodiment of the present invention. An alternating current (AC) Permanent Magnet Synchronous Motor (PMSM) 16 is held within a casing 28 by mounting screws 30 and mounting screw O-rings 31. The PMSM 16 is controlled by an integrated AC servo controller 20 and a motherboard 22 that is attached directly to an absolute encoder 18. These components 20, 22, and 18 are contained inside an isolating shield 26 and encapsulated in the casing 28. The PMSM 16 rotates a motor shaft 14. The absolute encoder 18 monitors the angular position of the PMSM 16. The AC servo controller 20 attaches to the motherboard 22. An end of the motherboard 22 attaches to a connector 24, which is secured in a connector housing 34. The integrated AC servo controller 20 and the motherboard 22 communicate electronically with a machine tool via CANopen® protocol through a plurality of pins (not labeled), molded inside the connector 24.

A top cap 12 attaches to the motor shaft 14 protruding out of the end of the casing 28. A sensing needle 10 is attached to the top cap 12 and is driven by the motor shaft 14. A seal pack includes a first seal 32 that is outside of the casing 28 and is wedged at a predetermined compression between an outer surface of the casing 28 and a top seal retaining ring 33 and a second seal 29 that is inside of the casing 28 is wedged between the PMSM 16 and an inner surface of the casing 28. An O-Ring 36 seals a second end of the casing 28. These ensure internal components 16, 18, 26, 20, 22, 24 inside the casing 28 are sealed against external contaminates thus conforming to an IP67 rating for liquid infiltration. A retaining clip 38 holds the internal components 16, 18, 26, 20, 22, 24 in place inside of the casing 28.

Figure 6:
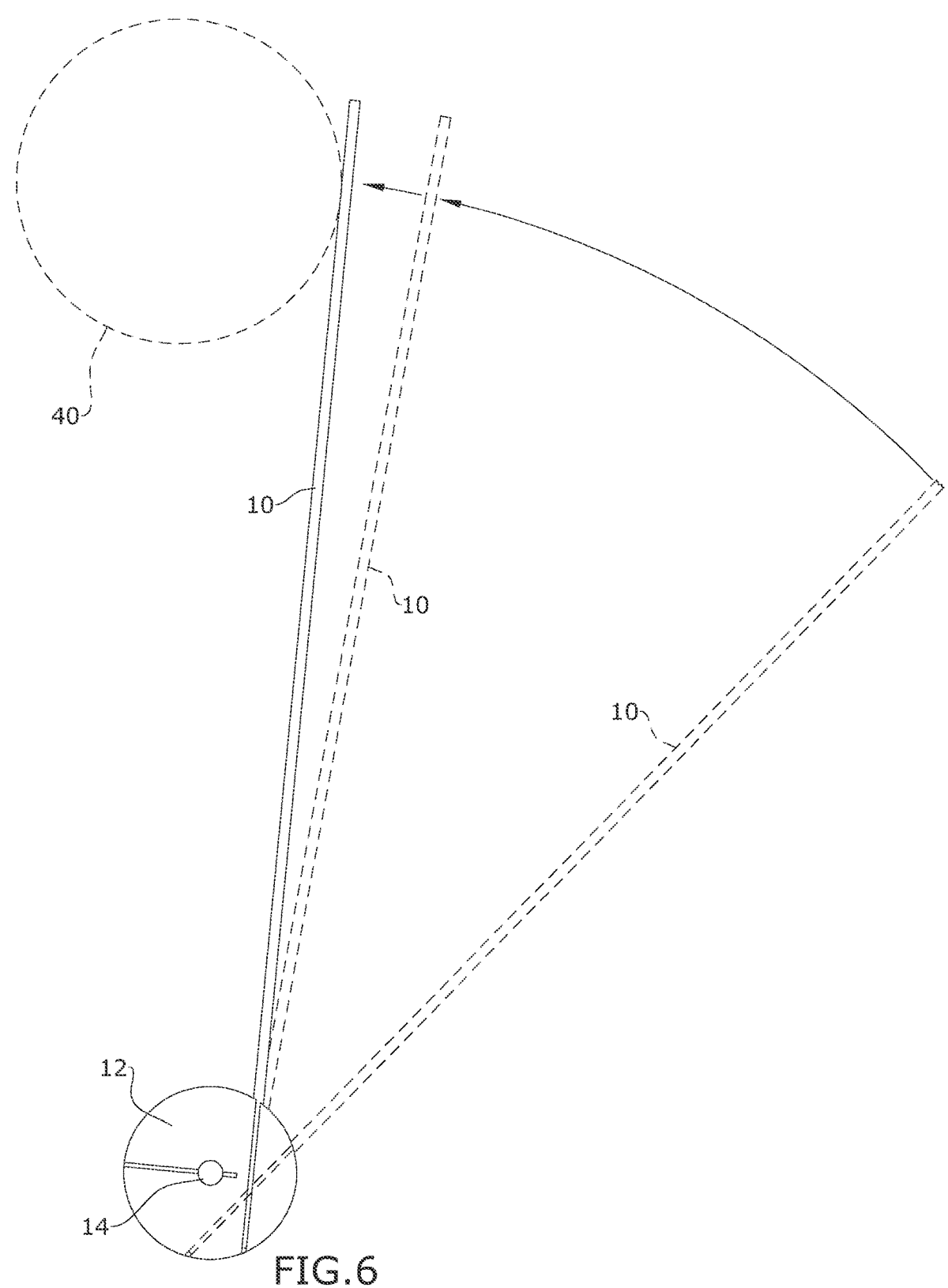
FIG. 6 is a top view thereof showing a tool detection.

FIGS. 5 and 6 detail a rotation of the sensing needle 10. The sensing needle may contact an object 40 at a learned position, alerting the device as to the presence or a change in presence of the object 40.

According to method steps of the present invention, the sensing needle 10 may learn or record its home position. The sensing needle may then locate or sense tools or objects to be detected by rotating clockwise or counterclockwise. The sensing needle 10 may learn a position of the object 40 by rotating in one direction or both directions. If rotating in both directions, the sensing needle 10 may learn two different positions of the object being monitored or two different objects, for example a front face and a rear face. The newly learned position(s) of the object is utilized with the previously learned and established home position. These parameters are stored directly into the sensor's own permanent memory that is integrated in the AC servo controller 20 and the motherboard 22. These functions are achieved by deploying software such as "Adaptive Touch Technology®" ("ATT") software, integrated into the AC servo controller 20 and the motherboard 22. The software may properly control all the function and full operation of the brushless motor as it is used as a monitoring device, with all its sophistication needed to detect, in the case of very small tools as example, tools as small as 0.2 mm in diameters without damaging the sensor (or parts thereof) or the object therefore being very soft in touch yet very fast reacting and very precise. The software may enable learning a home position, learning about an object in a clockwise direction or counterclockwise direction or both, and for every sensor, in the case multiple sensors are daisy chained together up to a max of 127 sensors, set and learn specific parameters for each of the sensors.

After completing this initial learning process, the sensing needle 10 may begin its monitoring function. The present invention monitors for a change in position of the object 40 by rotating the sensing needle 10 and comparing a radial location of the sensing needle to the initially detected object position.

The integrated AC servo controller 20 receives the start signal, provided to the AC servo controller 20 directly from a machine control, and communicated via the integrated CANopen® protocol through the plurality of pins located inside the connector 24, the sensing needle 10 then begins its rotation in one direction. The present invention may adapt to any machine control. Each machine tool (a lathe, a rotary transfer machine, a mill, etc.) made may have their own commercially standard control, such as a proprietary control or even a standard control platform with an integrated proprietary control feature on top of the standard control platform. The sensing needle 10 may then rotate in the opposite direction if programmed to do such. The sensing needle 10 rotates in accordance with the parameters previously set and stored in the permanent memory of the integrated AC servo controller 20 and the motherboard 22 dictating torque, velocity, and sensitivity.

As the sensing needle 10 is about to approach the object 40, acting in accordance with the algorithms being analyzed by the ATT software stored in its permanent memory of the integrated AC servo controller 20 and the motherboard 22, it may slow down or decelerate in accordance with the parameters previously set, taking into consideration the size of the object 40 being monitored. The sensing needle 10 may contact the object 40 without causing damage to the sensing needle 10 or object 40.

The integrated AC servo controller 20, having detected a change of status, such as a stop in rotation caused by the sensing needle 10 contacting the object 40 utilizes its closed-loop communication technology and immediately begins rotation in the opposite direction and returns to the sensing needle 10 to its home position. The integrated AC servo controller 20, being the device that controls and monitors functions of the brushless motor, detects a change in state as the rotation is stopped prematurely or the rotation has in fact reached the predetermined location previously set during the teach function where the system learns the specific position of the object to be detected. The system in accordance with a programmable preset "window", a range in the plus or minus form the actual position of the object, determines if the position was reached. With the closed-loop communication technology, at all times the servo controller and the motor know what one another are doing and at what state of the operation one is in versus the other. Therefore one does not have to rely on getting a specific signal back from a device and having to acknowledge that information for every step of the operation but instead the communication is constant. Closed-loop refers to a continuous cycle of information always and constantly updated without the need to actually prompt a send command.

The integrated AC servo controller 20 and the motherboard 22 may communicate directly through CANopen® technology via the connector 24 with the machine tool, without additional external controls. Based on conditions sensed by the sensing needle, the machine tool may be instructed to continue to operate or immediately pause its operation. The machine tool may be any machine such as a lathe, a rotary transfer machine, a mill a machining center, an assembly machine, or any machine the sensor may be coupled with to monitor a specific object for presence or absence or monitor a feature, in the case of monitoring the presence or absence of a hole.

If the sensing needle 10 reaches an area or areas where the object 40 is expected to be found, and instead the sensing needle 10 goes past the learned position (for example, if the object 40 is broken or missing), the system will instantly determine a change in condition from what was originally learned during setup and stored in the integrated AC servo controller 20 and the motherboard 22. The sensing needle may immediately return to its home position, and through its integrated CANopen® technology, the sensing needle 10 may communicate the abnormal finding via the connector 24 to the machine tool. The machine tool may determine if it should continue its operation, stop, or in any case act in accordance with predetermined set parameters.

The present invention may similarly be utilized to monitor free space. For example, the sensing needle 10 may contact an object 40, triggering an abnormal finding and communicating such to the machine tool. The sensing needle 10 would return to its home position, and the sensor would wait for a new start signal to be sent and consequently received by its integrated AC servo controller 20 and the motherboard 22.

Utilizing the CANopen® protocol, multiple sensors may be linked together and each individual sensor, with its own set parameters stored in each individual sensor integrated AC servo controller 20 and the motherboard 22, can operate independently, and output its own individual monitoring results through the individual connector 24, all communicating at the same time with a machine tool control.

It should be understood, of course, that the foregoing relates to exemplary embodiments of the invention and that modifications may be made without departing from the spirit and scope of the invention as set forth in the following claims.

What is claimed is:

1. A detection sensor for monitoring a machining system to detect a presence or absence of a tool or object in a machining system; the detection sensor comprising:
   a casing that defines a casing cavity therein;
   an alternating current (AC) permanent magnet synchronous motor (PMSM) arranged in a first segment of the casing cavity, the PMSM including a motor shaft that extends through a wall of the casing to a location that is outside of the casing cavity;
   a sensing needle mounted outside of the casing cavity, wherein:
      the sensing needle is driven into movement by rotation of the motor shaft of the PMSM during a monitoring procedure through a range of motion; and
      during the monitoring procedure while the sensing needle moves the through the range of motion, the sensing needle physically contacts the tool or object as a presence detection event; and
   a control device configured to control the PMSM for commanding movement of the sensing needle during the monitoring procedure is arranged in a second segment of the casing cavity.

2. The detection sensor of claim 1, wherein:
   the control device is an AC servo controller that is mounted in the second segment of the casing cavity and is communicatively connected to the PMSM.

3. The detection sensor of claim 2, further comprising a connector arranged at an end of the casing, and wherein:
   the connector defines:
      an inner connect segment that faces toward the casing cavity; and
      an outer connector segment that faces away from the casing cavity; and
   the AC servo controller is supported by the connector within the second segment of the casing cavity.

4. The detection sensor of claim 3, further comprising a connector housing arranged at the end of the casing.

5. The detection sensor of claim 4, further comprising an isolating shield arranged within the casing and wherein:
   the AC servo controller is contained inside the isolating shield.

6. The detection sensor of claim 2, further comprising:
   an angular position monitor arranged within the casing cavity and configured to evaluate a rotational position of the motor shaft of the PMSM.

7. The detection sensor of claim 6, wherein the angular position monitor is an encoder.

8. The detection sensor of claim 7, wherein:
   the PMSM defines a motor body with a first end and an opposite second end;
   the motor shaft extends from the first end of the motor body through the wall of the casing; and
   the encoder is mounted to the second end of the motor body.

9. The detection sensor of claim 2, further comprising a motherboard that is mounted in the second segment of the casing cavity and is communicatively connected to a machine of the machining system.

10. The detection sensor of claim 9, further comprising a connector arranged at an end of the casing, and wherein:
    the connector defines:
       an inner connect segment that faces toward the casing cavity; and
       an outer connector segment that faces away from the casing cavity; and both the AC servo controller and the motherboard are supported by the connector within the second segment of the casing cavity.

11. The detection sensor of claim 10, further comprising a connector housing arranged at the end of the casing.

12. The detection sensor of claim 11, further comprising an isolating shield arranged within the casing and wherein:
both the AC servo controller and the motherboard are contained inside the isolating shield.

* * * * *